Sept. 12, 1944.  M. P. NICHOLS  2,358,245
DIAL-AND-POINTER INDICATING DEVICE
Filed Sept. 25, 1943  4 Sheets-Sheet 1

Inventor
Malcolm P. Nichols

Patented Sept. 12, 1944

2,358,245

UNITED STATES PATENT OFFICE 2,358,245

DIAL-AND-POINTER INDICATING DEVICE

Malcolm P. Nichols, North Haven, Conn.

Application September 25, 1943, Serial No. 503,825

20 Claims. (Cl. 116—124.2)

The present invention relates to improvements in dial-and-pointer indicating devices for use in a wide variety of situations such, for instance, as radio-receiving sets, pressure gauges, time instruments and measuring instruments.

One of the objects of the present invention is to provide a superior dial-and-pointer indicating device by means of which the pointer may be caused to advance and retire lengthwise of itself to follow desired indicia on the dial.

Another object of the present invention is to provide a superior dial-and-pointer indicating device in which the pointer will automatically advance and retire lengthwise of itself to conform to a line of indicia which is non-concentrically or irregularly arranged on a dial.

A further object of the present invention is to provide a dial-and-pointer indicating device having a superior construction and arrangement of parts comprising a dial-member and a pointer-member and one of which members rotates with respect to the other and whereby the pointer may be caused to automatically advance and retire lengthwise of itself in a substantially-radial direction to conform to indicia non-concentrically arranged upon the said dial.

Still another object of the present invention is to provide a superior dial-and-pointer indicating device comprising a dial-member and a pointer-member and one of which members rotates with respect to the other and whereby the pointer automatically advances and retires in a substantially-radial direction to conform to a spirally-arranged line of indicia on the said dial.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 9 is a sectional view taken on the line 9—9 of Fig. 8 but on a larger scale;

*The structure of Figs. 1 to 4 inclusive*

Figures 1, 2, 3, 4:
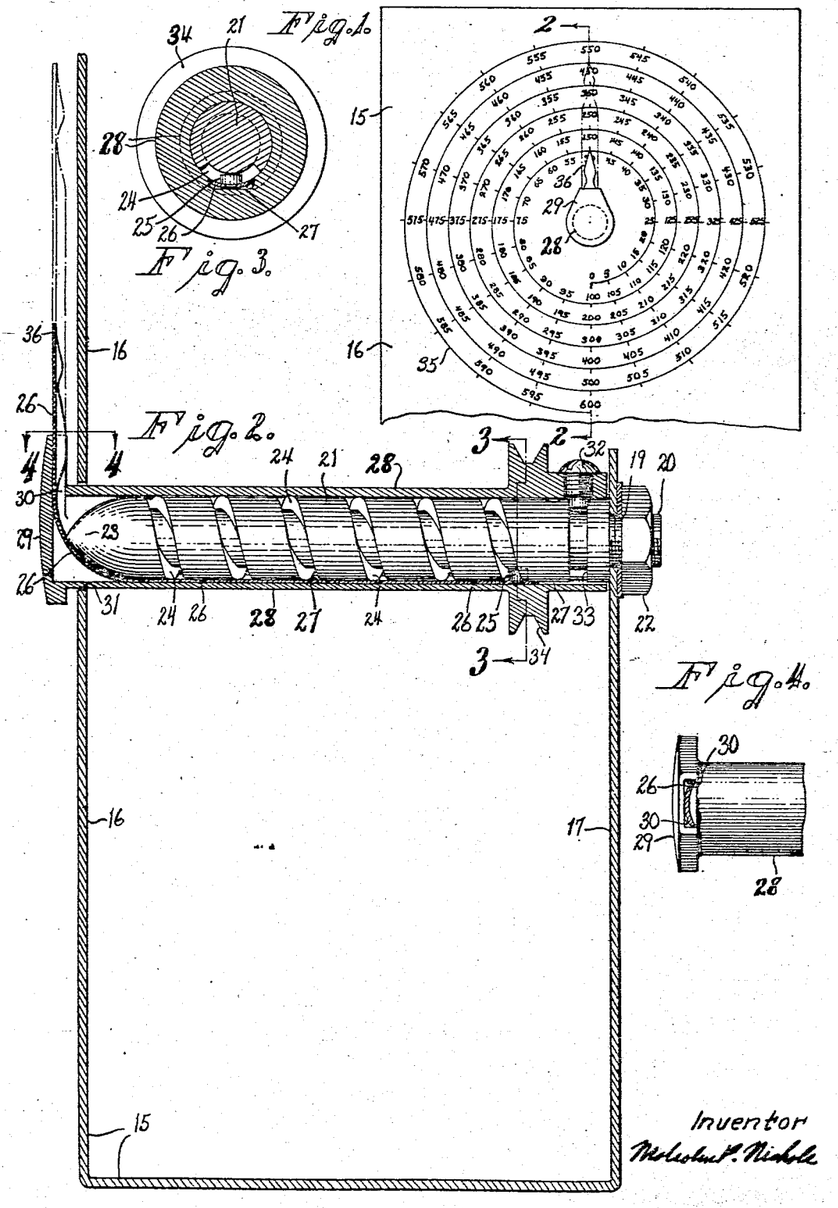
Fig. 1 is a broken view in front elevation of one form of dial-and-pointer indicating device embodying the present invention.
Fig. 2 is a transverse sectional view taken on the line 2—2 of Fig. 1 but on a larger scale.
Fig. 3 is a transverse sectional view taken on the line 3—3 of Fig. 2.
Fig. 4 is a broken detailed sectional view taken on the line 4—4 of Fig. 2 but omitting the frame.

The dial-and-pointer indicating device shown in the figures referred to comprises a frame 15 of substantially U-shaped form and which may be conveniently formed of a single piece of sheet metal folded up into substantially U-shaped form to provide a relatively-tall front-plate 16, a relatively-low parallel back-plate 17, and a bottom-plate integrally connecting the respective lower edges of the front-plate 16 and back-plate 17, as is especially well shown in Fig. 2.

Adjacent its upper edge and centrally intermediate its respective opposite side-edges the back-plate 17 of the frame 15 is formed with an aperture 19 through which rearwardly extends the integral threaded stem 20 of a stud 21 forwardly projecting from the said back-plate 17 and rigidly secured thereto by a clamping-nut 22 threaded onto the stem 20 at the rear of the back-plate 17. The stud 21 is of substantially-cylindrical form save at its forward end, where it is shaped to provide a substantially-conoidal point 23 for purposes as will hereinafter appear.

The stud 21 is formed in its periphery with a helical thread-like cam-groove 24 which receives an actuating-finger or -pin 25 projecting radially inwardly from the inner end of a flexible tape-like pointer 26. The said flexible tape-like pointer 26 is preferably formed from spring-tempered steel, bronze or other suitable material having a relatively-high elastic limit. Preferably, the tape-like pointer 26 is pre-shaped to provide it with a transverse curvature substantially conforming in radius to the radius of the stud 21 or its equivalent.

The inner portion of the tape-like pointer 26 is located in a longitudinal guide-groove 27 formed in the inner surface of a tubular casing or guide-member generally designated by the reference character 28 and which may be conveniently molded from metal such, for instance, as by die casting, or molded from plastic material. At its outer end, the casing or guide-member 28 is formed with an integral head 29 in which is formed a substantially-radial guideway 30 intersecting the outer edge of the said head and communicating at its inner end with the hollow interior of the tubular casing 28, as is shown especially well in Fig. 2.

The outer portion of the flexible tape-like pointer 26 rides substantially radially through the guideway 30 just referred to, and the intermediate portion of the said pointer is deflected into a substantially-quarter-circle bend by the conoidal point 23 of the stud 21. It may be noted that while the tape-like pointer 26 is pre-shaped to have a transverse curvature, as is clearly indicated in Figs. 3 and 4, the portion of the said pointer at any time adjacent the conoidal point 23 of the stud 21 will become flat transversely, owing to the longitudinal curvature imparted to it at this point. Throughout the major portion of its length, the pointer 26 is of uniform width suitable for being accommodated with a free sliding fit in the guide-groove 27 of the casing 28 and in the guideway 30 of the head 29 of the said casing.

The tubular guide-member or casing 28 extends through a central aperture 31 in the front plate 16 of the frame 15, and is mounted with capacity for turning movement upon the stud 21 before referred to. For the purpose of preventing the axial displacement of the casing 28 with respect to the stud 21, while at the same time permitting the free rotary movement of the said casing with respect to the said stud, the said casing is provided at its inner end with a radially-arranged limiting-screw 32, as is shown in Fig. 2. The said limiting-screw has its slender cylindrically-contoured inner portion extended into an annular limiting-groove 33 formed in the inner portion of the stud 21 at a point just forwardly of the back-plate 17. The tubular casing 28 or its equivalent may be rotated on the stud 21 or its equivalent in any suitable manner, but in the structure shown the said casing is formed adjacent its rear end with a grooved pulley 34 adapted to receive any suitable cord or belt extending to any desired operating device such, for instance, as to the condenser in a radio-receiving set, so that the casing 28 will be turned in synchronism with such condensers in a manner well understood in the art.

In the structure of Figs. 1 to 4 inclusive, the forward face of the front-plate 16 constitutes a dial and has engraved or otherwise applied thereto a spiral line 35 having adjacent thereto a spiral series of indicia as shown in Fig. 1. The outer end of the flexible pointer 26 is shaped in the form of an arrow-tip to provide what for convenience will be referred to as a pointer-tip 36 which in a manner as will hereinafter appear, moves radially inwardly and outwardly in parallelism with the forward face of the front-plate 16 in a path parallel therewith.

When the tubular guide-member or casing 28 is turned by any suitable means, the flexible tape-like pointer 26 will bodily move therewith. By this movement, the actuating-finger or -pin 25 at the inner end of the pointer 26 will ride in the cam-groove 24 of the rigid stationary stud 21 with the effect of moving the inner portion of the said pointer longitduinally of itself within the casing 28 and similarly causing the outer portion, including the pointer-tip 36 to move radially as it is bodily turned with the casing 28. The movement of the pointer-tip referred to, will be in a spiral path determined by the pitch of the cam-groove 24 in the stud 21 and in the instance shown conforming to the spiral line 35.

Figure 5:
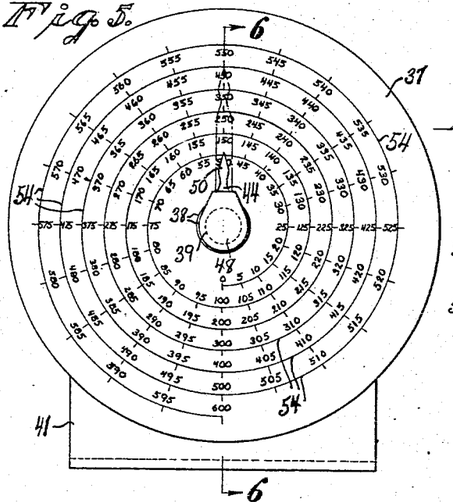
Fig. 5 is a view in front elevation of another form of dial-and-pointer indicating device constructed in accordance with the present invention.
Figure 6:
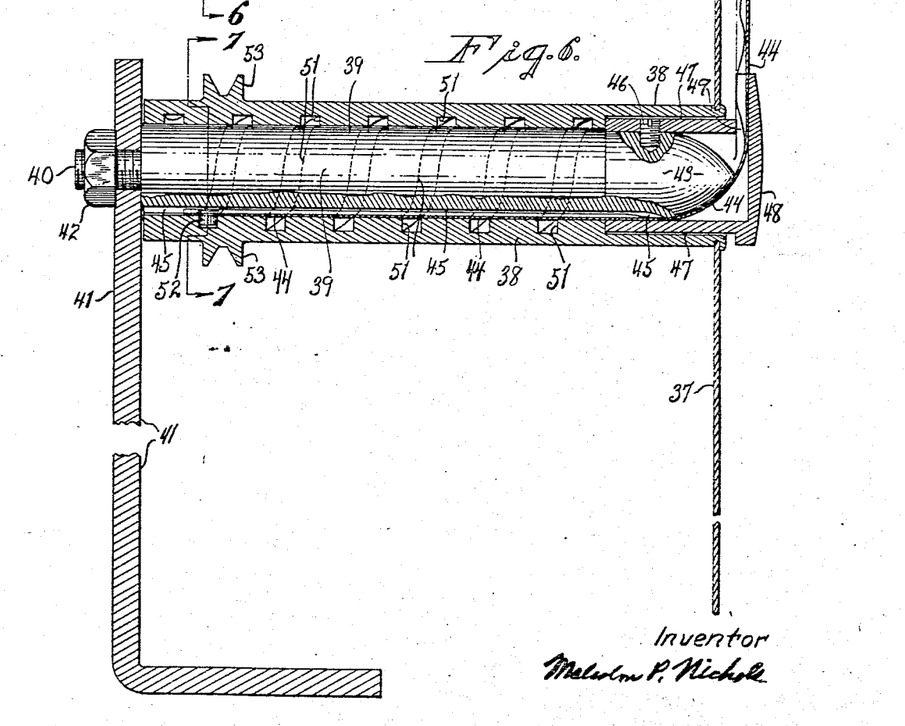
Fig. 6 is a broken sectional view thereof taken on the line 6—6 of Fig. 5 but on a larger scale.
Figure 7:
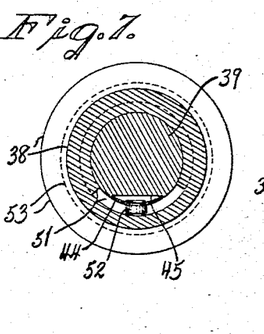
Fig. 7 is a sectional view taken on the line 7—7 of Fig. 6.

The structure of Figs. 5, 6 and 7

The structure now to be described includes a rotary disc-like dial 37 rigidly mounted at the forward end of a tubular casing 38 which is mounted for rotary movement upon a stud 39 arranged coaxially with respect to the dial 37. At its rear end, the stud 39 is formed with a relatively-slender threaded stem 40 projecting rearwardly through the upper end of an L-shaped frame 41 and clamped thereto by a clamping-nut 42, as is shown in Fig. 6.

Like the stud 21, the stud 39 is of cylindrical form throughout the major portion of its length and is provided at its forward end with a conoidal point 43 acting in conjunction with the casing 38 as a deflector for the intermediate portion of a tape-like flexible pointer 44 generally corresponding to the pointer 26 before described. The stud 39 instead of having a helical cam-groove thereon, is provided in its periphery with a longitudinal guide-groove 45 in which reciprocates the inner portion of the pointer 44.

Rigidly secured by means of a screw 46 to the outer end of the stud 39 is the rearwardly-projecting tubular stem 47 of a head 48. The outer portion of the said head 48 is formed with a radial guideway 49 through which extends the adjacent portion of the pointer 44, which latter has at its outer end a pointer-tip 50 corresponding to the pointer-tip 36 before described, and adapted to move radially with respect to the revolving dial 37.

The tubular stem 47 of the head 48 extends within a suitably-shaped annular recess in the forward end of the tubular casing 38 and its inner edge acts as a stop to prevent the undue forward axial displacement of the said casing. The casing 38 is in turn prevented from having undue rearward axial movement relative to the stud 39 by the upper portion of the frame 41.

The casing 38 is formed interiorly with a helical thread-like cam-groove 51 receiving an actuating-pin or -finger 52 riveted to and projecting radially outwardly from the inner end of the tape-like pointer 44. Upon the exterior of its rear portion, the casing 38 is provided with an integral grooved pulley 53 by means of which the said casing may be rotated upon the rigid stud 39. As is shown in Fig. 5, the front face of the rotary dial 37 is provided with a spiral line 54 adjacent which is a spiral series of indicia of any desired character and spacing.

When the casing 38, and the dial 37 carried thereby, is rotated upon the fixed stud 39, the cam-groove 51 in the said casing, acting upon the actuating-pin 52, will cause the pointer 44 to move lengthwise of itself at such a rate as to cause its pointer-tip 50 to accurately follow the spiral line 54 on the rotary dial 37.

Figures 7, 8, 10:
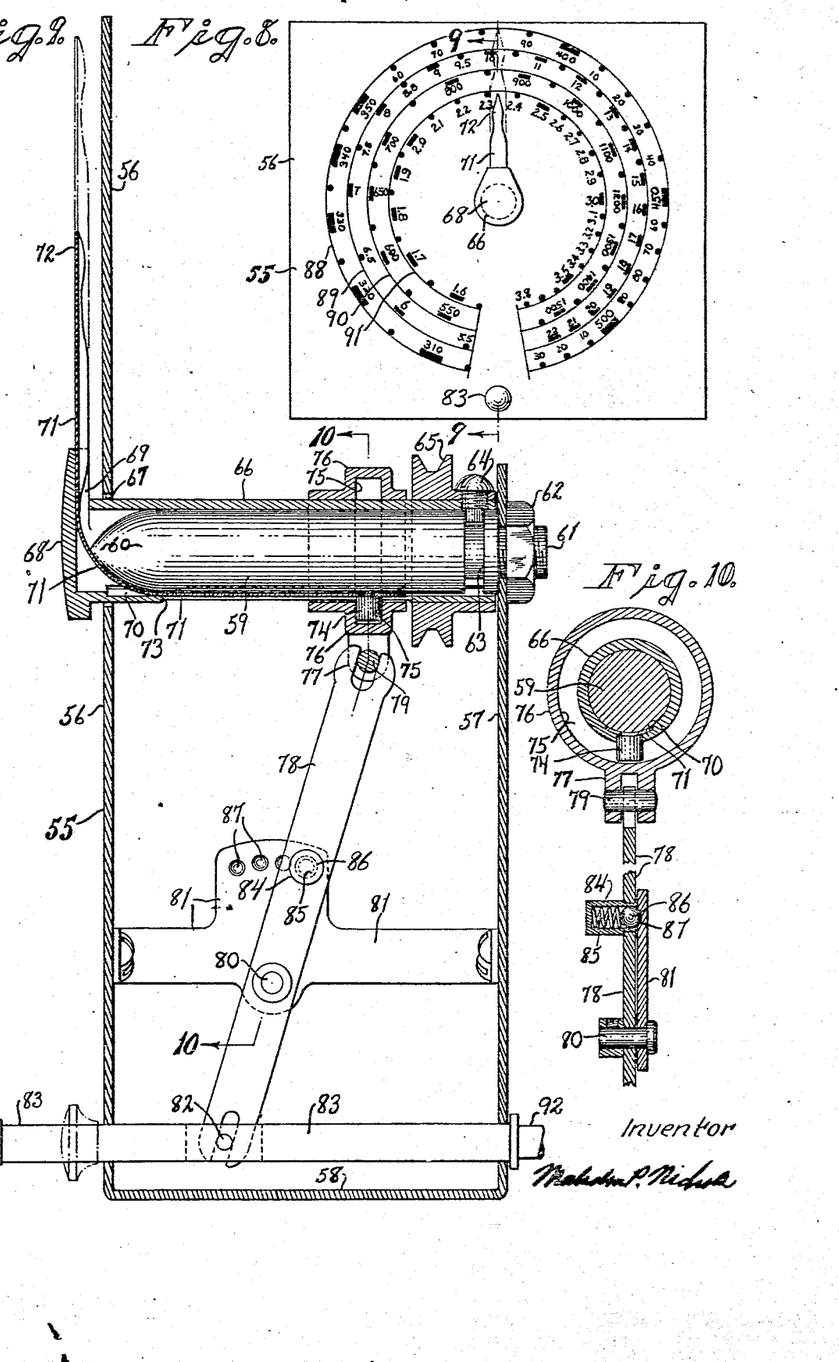
Fig. 8 is a view in front elevation of still another form of dial-and-pointer indicating device embodying the present invention.
Fig. 10 is a broken detail sectional view taken on the line 10—10 of Fig. 9.

The structure of Figs. 8, 9 and 10

The dial-and-pointer device illustrated in these figures is designed to cause a pointer to follow any one of a plurality of different-diametered paths or bands of indicia and is admirably suited for use in connection with radio-receiving sets, though useful in a wide variety of other situations.

The device shown includes a frame generally designated by the reference character 55 and which may be conveniently folded up from sheet metal into substantially U-shaped form to provide a relatively-tall rectangular front-plate 56 and a relatively-short back-plate 57 integrally united at their respective lower edges by a bottom-plate 58.

Rigidly projecting forwardly from the upper portion of the back-plate 57 is a stud 59 of substantially-cylindrical form throughout the major portion of its length and, like the studs previously described, having a substantially-conoidal guide-point 60. For purposes of rigidly uniting the stud 59 to the back-plate 57, the said stud is provided with an integral relatively-slender threaded stem 61 projecting rearwardly through the said back-plate 57 and having applied to its rear end a clamping-nut 62.

Immediately forwardly of the back-plate 57 the stud 59 is formed with an annular limiting-groove 63 receiving the reduced inner end of a limiting-screw 64 projecting radially inwardly through the hub of a grooved pulley 65 and through the inner end of a tubular casing or guide-member 66. The limiting-screw 64 as thus constructed and arranged serves to rigidly unite the pulley 65 and the casing 66 and further serves to prevent both thereof from being displaced longitudinally with respect to the stud 57 while at the same time, permitting the said parts 65 and 66 to rotate as a unit freely on the said stud 59.

The outer portion of the tubular casing 66 projects through an aperture 67 in the front-plate 56 of the frame 55 and is formed at its extreme forward end with an integral head 68 corresponding to the head 29 previously described, and formed with a substantially-radial guideway 69 leading from its outer edge to the hollow interior of the tubular casing 66, as is especially well known in Fig. 9. At a point diametrically opposite the guideway 69, the body-portion of the casing 66 is formed with a longitudinal guide-groove 70 of sufficient width to receive with an easy sliding fit, the inner horizontal reach of a flexible tape-like pointer 71 of the same general character as the pointers 26 and 44 before referred to. The said pointer is provided at its outer end with a tapering pointer-tip 72 movable in a plane at substantially a right angle to the inner portion of the pointer and in substantial parallelism with the front-plate 56.

Midway the width of its guide-groove 70, the body-portion of the casing 66 is formed with a relatively-narrow longitudinal clearance-slot 73 through which outwardly projects an actuating-pin or -finger 74 firmly riveted to or otherwise forming a rigid feature of the inner portion of the tape-like pointer 71. Exteriorly of the tubular casing 66, the actuating-pin 74 fits within an annular inwardly-opening groove 75 formed in the interior of an actuating-collar 76 laterally encircling and riding upon the periphery of the casing 66. The actuating-collar 76 is free to slide axially upon the outer surface of the casing 66 while the latter rotates around the stud 59 as an axis and within the said actuating-collar.

For the purpose of moving the actuating-collar 76 lengthwise of the casing 66 to radially shift the pointer-tip 72, the said actuating-collar is formed in its lower portion with a bifurcated depending-lug 77 receiving the bifurcated upper end of an operating-lever 78. Extending crosswise of the said lug 77 and through the bifurcated upper end of the operating-lever 78 is a coupling-pin 79 clearly shown in Figs. 9 and 10. The operating-lever 78 is pivotally mounted upon a pivot-stud 80 carried by a bracket 81 extending from front to rear between the respective front- and back-plates 56 and 57 of the frame 55.

The lower end of the operating-lever 78 is bifurcated for the reception of a coupling-pin 82 mounted in a reciprocating operating-plunger 83 and serving to couple the latter and the lower end of the operating-lever 78 together. The operating-plunger 83 is supported with capacity for sliding movement, in both the front- and back-plates 56 and 57 of the frame 55.

For the purpose of yieldingly holding the operating-lever 78 in any given one of four (more or less) different positions, the said operating-lever has riveted or otherwise secured to it and laterally projecting from it, a cup-shaped housing 84 in which is located a helical detent-spring 85. The said detent-spring presses at one end against the end-wall of the cup-shaped housing 84 and at its opposite end presses against a ball-like detent 86 to yieldingly urge the latter into any given one of an arcuate series of four (more or less) detent-pockets 87 formed in the bracket 81 before referred to.

The forward face of the front-plate 56 of the frame 55 serves as a dial and has engraved or otherwise applied thereto a series of circular lines 88, 89, 90 and 91 respectively progressively increasing in diameter and arranged concentrically with respect to each other and with respect to the longitudinal axis of the stud 59.

If the casing 66 is turned by any suitable means when the parts are in the positions in which they are shown by full lines in the drawings, the pointer-tip 72 will sweep in a circular path immediately adjacent the inner circular line 88 in conjunction with such indicia as it may be desired to place adjacent the said line. If it is desired to bring the pointer-tip 72 into registration with the outer circular line 91, the operating-plunger may be moved from the position in which it is shown in full lines in Fig. 9 to the position in which it is shown by broken lines in the same figure, to thereby swing the operating-lever 78 in a counterclockwise direction and consequently slide the actuating-collar 76 forwardly to the limit of its forward movement. The shifting of the parts as just described will move the pointer-tip outwardly into the position in which it is indicated by broken lines in Figs. 8 and 9 and will cause the detent-ball 86 to enter the extreme left-hand detent-pocket 87 in the bracket 81, to thereby yieldingly retain the pointer-tip 72 in the position to which it has just been moved. By an appropriate shifting of the operating-lever, the pointer-tip 72 may be brought into registry with either one of the intermediate circular lines 89 or 90, and it is to be noted that when the said pointer-tip is registered with any one of the circular lines 88, 89, 90 and 91, it will be yieldingly restrained in the chosen position by the entry of the ball-like detent 86 into the appropriate one of the arcuate series of detent-pockets 87.

When shifted into registry with any one of the circular lines 88, 89, 90 and 91, the pointer-tip 87 may be turned throughout the full sweep of the chosen line by the riding of the actuating-finger 74 in the annular groove 75 in the actuating-collar 76.

The operating-plunger 83 is provided at its rear with an extension 92 by means of which the said operating-plunger may be connected, if desired, to a suitable switch to convert a radio-receiving set from one broadcast band to another simultaneously with the shifting of the pointer 71.

Figure 11:
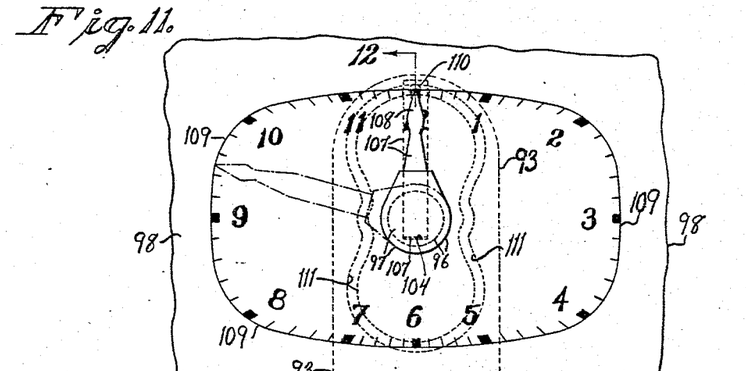
Fig. 11 is a broken view in front elevation of still another form which the present invention may assume.
Figures 12, 13:
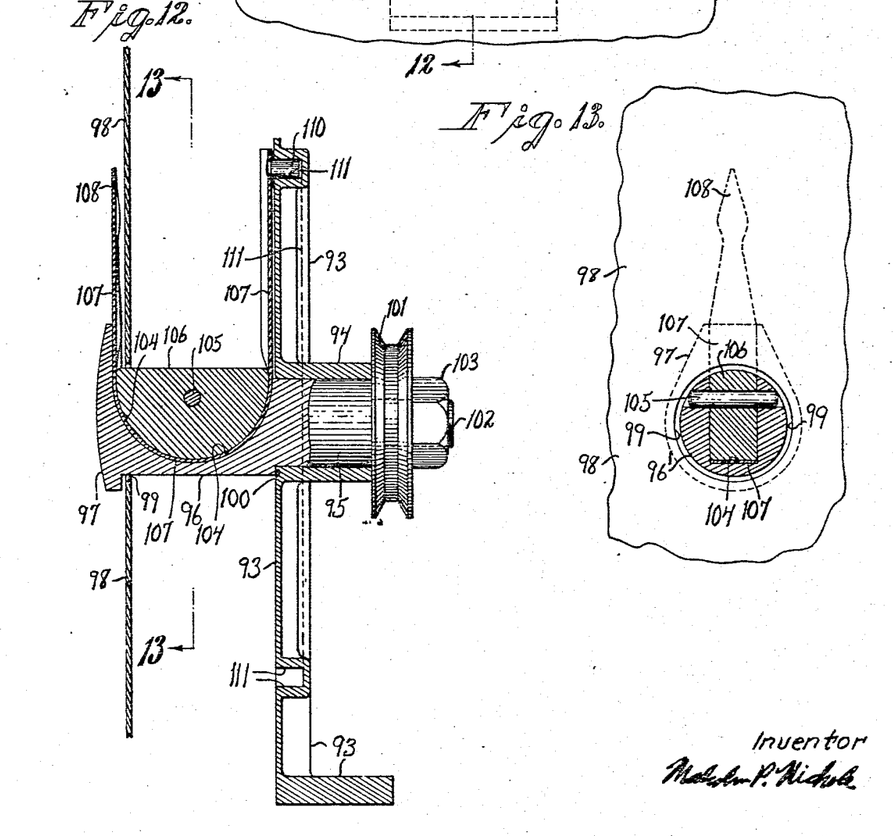
Fig. 12 is a broken sectional view taken on the line 12—12 of Fig. 11 but on a larger scale.
Fig. 13 is a broken detail sectional view taken on the line 13—13 of Fig. 12.

The structure of Figs. 11, 12 and 13

The dial-and-pointer device shown in this group of figures is constructed and arranged to have the pointer-tip follow a continuous uninterrupted line of substantially-elliptical form or other desired non-circular form.

The structure shown comprises a frame 93 provided with a rearwardly-projecting bearing-hub or sleeve 94 in which is journaled the cylindrically-contoured reduced-diametered rear portion 95 of a casing or body 96. The casing 96 is of substantially-cylindrical form throughout the major portion of its length save at its forward end, where it is provided with an eccentric head 97 located immediately in front of a dial 98. The dial 98 is formed substantially centrally with an aperture 99 for the clearance of the casing or body 96.

The casing or body 96 is prevented from being rearwardly displaced by the rearwardly-facing annular shoulder 100 formed at the junction of its reduced rear portion 95 with its forward main portion. The said casing or body 96 is prevented from having forward axial displacement by the bearing of the front face of a grooved pulley 101 against the rear edge of the bearing-hub or sleeve 94 of the frame 93, as is shown in Fig. 12. The pulley 101 is rigidly attached to the casing or body 96 by being sleeved over a slender stem 102 formed integral with and rearwardly-projecting from the said casing. A clamping-nut 103 threaded onto the stem 102, serves to bind the pulley 101 in place.

At a point forwardly of the front face of the frame 93, the casing or body 96 is formed with a substantially semicircular groove or pocket 104 having its curvature extending longitudinally of the said body and terminating at its forward end just forwardly of the front face of the dial 98 and terminating at its rear just forwardly of the front face of the frame 93. Secured in the groove or pocket 104 by means of a transverse pin 105, is a plug or filler-block 106 curved concentrically with the groove 104 in the body or casing 96. The radius of curvature of the plug or filler-block 106 is sufficiently smaller than the radius of the groove or pocket 104 in the casing 96 to provide a substantially-semicircular guideway between the two surfaces for the accommodation of the central portion of a flexible tape-like pointer 107.

Like the pointers of the preceding structures, the pointer 107 is preferably of spring temper and is pre-shaped to have a transverse curvature under normal unrestrained conditions, though when bent longitudinally, as shown in Fig. 12, around the plug or filler-block 106, that portion of the pointer assumes a straight line in transverse section, as will be seen by reference to Fig. 13. The pointer 107 is so proportioned as to slide freely between the concave surface of the groove or pocket 104 and the convex surface of the plug or filler-block 106.

At its outer end, the pointer 107 is sharpened to provide a pointer-tip 108 which will advance and retire as the casing 96 is rotated, to conform to a substantially-elliptical line 109 engraved or otherwise applied to the front face of the dial 98. For the purpose of automatically causing the pointer-tip 108 to follow the line 109 on the dial 98, the inner end of the pointer 107 has riveted or otherwise secured to it a rearwardly-extending actuating-pin 110 extending into a forwardly-opening cam-groove 111 formed in the frame 93 and symmetrically arranged around the axis of rotation of the casing 96 and the parts carried thereby.

When the casing or body 96 is rotated in the bearing-hub or sleeve 94 of the frame 93, the pointer 94 will also be bodily turned with the said body, with the effect of causing its actuating-pin 110 to ride in the cam-groove 111 of the said frame 93, to thereby move the pointer 107 lengthwise of itself to an extent required to cause its pointer-tip 108 to closely follow the elliptical line 109 on the dial 98. The contour of the cam-groove 111 or its equivalent may be varied as desired to cause the pointer-tip 108 to follow any one of a wide variety of paths.

General

From the foregoing and by reference to the accompanying drawings, it will be seen that a pointer-tip or its equivalent may be caused to travel over a dial in a wide variety of paths by means of the present invention. Furthermore by means of the present invention, instead of limiting a pointer to giving indications over but one revolution, the indications may be made over a plurality of revolutions such, for instance, as by structures like those of Figs. 1 to 7 inclusive. In this way, the dial-and-pointer device may be caused to accurately indicate very minute divisions.

By employing a tape-like pointer of spring-tempered material and having a pre-set transverse curvature, the straight reaches of such a pointer possess a flat-wise rigidity sufficient to make them self-supporting.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A dial-and-pointer indicating-device including in combination: a dial-member having indicia thereon; a pointer-member formed of flexible material and movable lengthwise of itself, the said pointer-member having an outer-portion disposed for reciprocation in a first plane adjacent the said dial-member; the said pointer-member also having an inner-portion disposed for reciprocation in a second and different plane, the said flexible pointer-member having a longitudinally-curved intermediate-portion connecting its said outer-portion and its said inner-portion; mounting-means constructed and arranged to provide for the turning movement of one of the said members with respect to the said other member; guide-means constructed and arranged to guide the said flexible pointer-member for movement lengthwise of itself; and actuating-means operatively connected to the said flexible pointer-member to shift the same lengthwise of itself and move its outer-portion to substantially conform to indicia on the said dial-member.

2. A dial-and-pointer indicating-device including in combination: a dial-member having indicia thereon; a pointer-member formed of flexible material and movable lengthwise of itself, the said pointer-member having an outer-portion disposed for reciprocation in a first plane adjacent the said dial-member, the said pointer-member also having an inner-portion disposed for reciprocation in a second and divergent plane, the said flexible pointer-member having a longitudinally-curved intermediate-portion connecting its said outer-portion and its said inner portion; mounting-means constructed and arranged to provide for the turning movement of one of the said members with respect to the other member; guide-means constructed and arranged to guide the said flexible pointer-member for movement lengthwise of itself in divergent planes; and actuating-means operatively connected to the said flexible pointer-member to shift the same lengthwise of itself and move its outer-portion to substantially conform to indicia on the said dial-member.

3. A dial-and-pointer indicating-device including in combination: a dial-member having indicia thereon; a tape-like pointer-member formed of flexible material and movable lengthwise of itself, the said pointer-member having a transversely-curved outer-portion disposed for reciprocation in a first plane adjacent the said dial-member, the said pointer-member having an inner-portion also transversely curved and disposed for reciprocation in a second and different plane, the said tape-like pointer-member having a longitudinally-curved intermediate-portion connecting its said outer-portion and its said inner-portion; mounting-means constructed and arranged to provide for the turning movement of one of the said members with respect to the said other member; guide-means constructed and arranged to guide the said tape-like pointer-member for movement lengthwise of itself; and actuating-means operatively connected to the said tape-like pointer-member to shift the same lengthwise of itself and move its outer-portion to substantially conform to indicia on the said dial-member.

4. A dial-and-pointer indicating-device including in combination: a dial-member having indicia thereon; a tape-like pointer-member formed of flexible material and movable lengthwise of itself, the said pointer-member having a transversely-curved outer-portion disposed for reciprocation in a first plane adjacent the said dial-member, the said pointer-member also having an inner-portion also transversely-curved and disposed for reciprocation in a second plane diverging with respect to the plane in which the said outer-portion reciprocates, the said flexible tape-like pointer-member also having a longitudinally-curved intermediate-portion connecting its said outer-portion and its said inner-portion; mounting-means constructed and arranged to provide for the turning movement of one of the said members with respect to the other member; guide means constructed and arranged to guide the said flexible pointer-member for movement lengthwise of itself in divergent planes; and actuating-means operatively connected to the said tape-like pointer-member to shift the same lengthwise of itself and move its transversely-curved outer-portion to substantially conform to indicia on the said dial-member.

5. A dial-and-pointer indicating-device including in combination: a dial-member having indicia thereon; a pointer-member formed of flexible material and movable lengthwise of itself, the said pointer-member having an outer-portion disposed for reciprocation in a first plane adjacent the said dial-member, the said pointer-member also having an inner-portion disposed for reciporcation in a second and different plane, the said flexible pointer-member having a longitudinally-curved intermediate-portion connecting its said outer-portion and its said inner-portion; mounting-means constructed and arranged to provide for the turning movement of one of the said members with respect to the said other member; guide-means constructed and arranged to guide the said flexible pointer-member for movement lengthwise of itself; and automatic actuating-means operatively connected to the said flexible pointer-member to automatically shift the same lengthwise of itself as one of the said members is turned with respect to the other member, to thereby move the outer-portion of the pointer-member lengthwise to substantially conform to the indicia on the said dial-member.

6. A dial-and-pointer indicating-device including in combination: a dial-member having indicia thereon; a pointer-member formed of flexible material and movable lengthwise of itself, the said pointer-member having an outer-portion disposed for reciprocation in a first plane adjacent the said dial-member and having an inner-portion disposed for reciprocation in a second plane diverging with respect to the said first plane, the said flexible pointer-member having a longitudinally-curved intermediate portion connecting its said outer-portion and its said inner-portion; mounting-means constructed and arranged to provide for the turning movement of one of the said members with respect to the other member; guide-means constructed and arranged to guide the said pointer-member for movement lengthwise of itself in divergent planes; and actuating-means operatively connected to the said flexible pointer-member to automatically shift the same lengthwise of itself as one of the said members is turned with respect to the other to thereby move the outer portion of the pointer-member to substantially conform to the indicia on the said dial-member.

7. A dial-and-pointer indicating-device including in combination: a dial-member having indicia thereon; a tape-like pointer-member formed of flexible material and movable lengthwise of itself, the said pointer-member having a transversely-curved outer-portion disposed for reciprocation in a first plane adjacent the said dial-member, the said pointer-member also having a transversely-curved inner-portion disposed for reciprocation in a second and different plane, the said tape-like pointer-member having a longitudinally-curved intermediate-portion connecting its said outer-portion and its said inner-portion; mounting-means constructed and arranged to provide for the turning movement of one of the said members with respect to the said other member; guide-means constructed and arranged to guide the said tape-like pointer-member for movement lengthwise of itself; and actuating-means operatively connected to the said tape-like pointer-member to automatically shift the same lengthwise of itself as one of the said members is turned with respect to the other member to thereby move the outer portion of the pointer-member to substantially conform to the indicia on the said dial-member.

8. A dial-and-pointer indicating-device including in combination: a dial-member having indicia thereon; a tape-like pointer-member formed of flexible material and movable lengthwise of itself, the said pointer-member having a transversely-curved outer-portion disposed for reciprocation in a first plane adjacent the said dial-member, the said pointer-member also having a transversely-curved inner-portion disposed for reciprocation in a second plane diverging with respect to the said first plane, the said tape-like pointer-member having a longitudinally-curved intermediate portion connecting its said outer-portion and its said inner-portion; mounting-means constructed and arranged to provide for the turning movement of one of the said members with respect to the other member; guide-means constructed and arranged to guide the said tape-like pointer-member for movement lengthwise of itself in divergent planes; and actuating-means operatively connected to the said tape-like pointer-member to automatically shift the same lengthwise of itself as one of the said members is turned with respect to the other member to thereby move the outer-portion of the pointer-member to substantially conform to the indicia on the said dial-member.

9. A dial-and-pointer indicating-device including in combination: a dial-member having indicia thereon; a pointer-member formed of flexible material and having reciprocating movement lengthwise of itself and having movement edgewise of itself, the said pointer-member having an outer portion disposed for lengthwise reciprocation and lateral edgewise movement in a first plane adjacent the said dial-member, the said pointer-member also having an inner-portion disposed for lengthwise reciprocation and for edgewise movement in a second and different plane, the said flexible pointer-member having a longitudinally-curved intermediate-portion connecting its said outer-portion and its said inner-portion; mounting-means constructed and arranged to provide for the edgewise turning movement of the said pointer-member with respect to the said dial-member; guide-means constructed and arranged to guide the said flexible pointer-member for movement lengthwise of itself; and actuating-means operatively connected to the said flexible pointer-member to shift the same lengthwise of itself and move its outer-portion to substantially conform to indicia on the said dial-member.

10. A dial-and-pointer indicating-device including in combination: a rotary dial-member having indicia thereon; a pointer-member formed of flexible material and movable lengthwise of itself, the said pointer member having an outer-portion disposed for reciprocation in a first plane adjacent the said rotary dial-member, the said pointer-member also having an inner-portion disposed for reciprocation in a second and different plane, the said flexible pointer-member having a longitudinally-curved intermediate-portion connecting its said outer-portion and its said inner-portion; mounting-means constructed and arranged to provide for the turning movement of the said dial-member with respect to the said pointer-member; guide-means constructed and arranged to guide the said flexible pointer-member for movement lengthwise of itself; and actuating-means operatively connected to the said flexible pointer-member to shift the same lengthwise of itself and to move its outer portion to substantially conform to indicia on the said dial-member.

11. A dial-and-pointer indicating-device including in combination: a dial-member having non-concentric indicia thereon; a pointer-member formed of flexible material and movable lengthwise of itself, the said pointer-member having an outer-portion disposed for reciprocation in a first plane adjacent the said dial-member, the said pointer-member also having an inner-portion disposed for reciprocation in a second and different plane, the said flexible pointer-member having a longitudinally-curved intermediate-portion connecting its said outer-portion and its said inner-portion; mounting-means constructed and arranged to provide for the turning movement of one of the said members with respect to the other member; guide-means constructed and arranged to guide the said flexible pointer for movement lengthwise of itself; and automatic actuating-means operatively connected to the said flexible pointer-member and constructed and arranged to automatically shift the same lengthwise of itself as one of the said members is turned with respect to the other member to thereby move the outer-portion of the said pointer-member lengthwise to substantially conform to the non-concentric indicia on the said dial-member.

12. A dial-and-pointer indicating-device including in combination: a dial-member having non-concentric indicia thereon; a pointer-member formed of flexible material and movable both lengthwise and laterally edgewise of itself, the said flexible pointer-member having an outer-portion disposed for lengthwise reciprocation and edgewise lateral movement in a first plane adjacent the said dial-member, the said pointer-member also having an inner-portion disposed for reciprocation and for edgewise lateral movement in a second and different plane, the said flexible pointer-member having a longitudinally-curved intermediate-portion connecting its said outer-portion and its said inner-portion; mounting-means constructed and arranged to provide for the turning movement of the said pointer-member laterally edgewise of itself with respect to the said dial-member; guide-means constructed and arranged to guide the said flexible pointer-member for movement lengthwise of itself; and automatic actuating-means operatively connected to the said flexible pointer-member to automatically shift the same lengthwise of itself as the pointer-member is moved edgewise of itself with respect to the said dial-member to thereby move the outer-portion of the said pointer-member lengthwise to substantially conform to the non-concentric indicia on the said dial-member.

13. A dial-and-pointer indicating-device including in combination: a rotary dial-member having non-concentric indicia thereon; a pointer-member formed of flexible material and movable lengthwise of itself, the said pointer-member having an outer-portion disposed for reciprocation in a first plane adjacent the said dial-member, the said pointer-member also having an inner-portion disposed for reciprocation in a second and different plane, the said flexible pointer-member having a longitudinally-curved intermediate-portion connecting its said outer-portion and its said inner-portion; mounting-means constructed and arranged to provide for the turning movement of the said dial-member with respect to the said pointer-member; guide-means constructed and arranged to guide the said flexible pointer-member for movement lengthwise of itself; and automatic actuating-means operatively connected to the said flexible pointer-member to automatically shift the same lengthwise of itself as the said rotary dial-member is turned with respect to the said pointer-member to thereby move the outer-portion of the latter lengthwise in substantial conformity to the non-concentric indicia on the said dial-member.

14. A dial-and-pointer indicating-device including in combination: a dial-member having spirally-arranged indicia thereon; a pointer-member formed of flexible material and movable lengthwise of itself, the said pointer-member having an outer-portion disposed for reciprocation in a first plane adjacent the said dial-member, the said pointer-member also having an inner-portion disposed for reciprocation in a second and different plane, the said flexible pointer-member having a longitudinally-curved intermediate-portion connecting its said outer-portion and its said inner-portion; mounting-means constructed and arranged to provide for the turning movement of one of the said members with respect to the other member; guide-means constructed and arranged to guide the said flexible pointer-member for movement lengthwise of itself; and automatic actuating-means operatively connected to the said flexible pointer-member to automatically shift the same lengthwise of itself as one of the said members is turned with respect to the other member to thereby move the outer-portion of the pointer-member lengthwise in substantial conformity to the spirally-arranged indicia on the said dial-member.

15. A dial-and-pointer indicating-device including in combination: a dial-member having spirally-arranged indicia thereon; a pointer-member formed of flexible material and having movement both lengthwise of itself and laterally edgewise of itself, the said pointer-member having an outer-portion disposed for reciprocation and edgewise lateral movement in a first plane adjacent the said dial-member, the said pointer-member also having an inner-portion disposed for reciprocation and lateral edgewise movement in a second and different plane, the said flexible pointer-member having a longitudinally-curved intermediate-portion connecting its said outer-portion and its said inner-portion; mounting-means constructed and arranged to provide for the edgewise turning movement of the said pointer-member with respect to the said dial-member; guide-means constructed and arranged to guide the said flexible pointer-member for movement lengthwise of itself; and automatic actuating-means operatively connected to the said flexible pointer-member to automatically shift the same lengthwise of itself as the pointer-member moves laterally edgewise of itself to thereby move the outer-portion of the pointer-member lengthwise in substantial conformity to the spirally-arranged indicia on the said dial-member.

16. A dial-and-pointer indicating-device including in combination: a rotary dial-member having spirally-arranged indicia thereon; a pointer-member formed of flexible material and movable lengthwise of itself, the said pointer-member having an outer-portion disposed for lengthwise reciprocation in a first plane adjacent the said dial-member, the said pointer-member also having an inner-portion disposed for lengthwise reciprocation in a second and different plane, the said flexible pointer-member having a longitudinally-curved intermediate-portion connecting its said outer-portion and its said inner-portion; mounting-means constructed and arranged to provide for the turning movement of the said dial-member with respect to the said pointer-member; guide-means constructed and arranged to guide the said flexible pointer-member for movement lengthwise of itself; and automatic actuating-means operatively connected to the said flexible pointer-member to automatically shift the same lengthwise of itself as the said dial-member is turned with respect thereto to thereby move the outer-portion of the said pointer-member lengthwise in substantial conformity to the spirally-arranged indicia on the said dial-member.

17. A dial-and-pointer indicating-device including in combination: a dial-member having indicia thereon; a pointer-member formed of flexible material and movable lengthwise of itself, the said pointer-member having an outer-portion disposed for reciprocation in a first plane substantially parallel with the said dial-member, the said pointer-member also having an inner-portion disposed for reciprocation in a plane substantially perpendicular with respect to the plane of the said dial-member, the said flexible pointer-member having a longitudinally-curved intermediate-portion connecting its said outer-portion and its said inner-portion; mounting-means constructed and arranged to provide for the turning movement of one of the said members with respect to the other member; guide-means constructed and arranged to guide the said flexible pointer-member for movement lengthwise of itself; and actuating-means operatively connected to the said flexible pointer-member to shift the same lengthwise of itself in the two aforesaid planes to thereby move the outer-portion of the said pointer-member in substantial conformity to indicia on the said dial-member.

18. A dial-and-pointer indicating-device including in combination: a dial-member having indicia thereon; a pointer-member formed of flexible material and movable lengthwise of itself, the said pointer member having an outer-portion disposed for reciprocation in a plane substantially parallel with the plane of the said dial-member; the said pointer-member also having an inner-portion disposed for reciprocation in a plane substantially perpendicular to the plane of the said dial-member; the said flexible pointer-member having a longitudinally-curved intermediate-portion connecting its said outer-portion and its said inner-portion; mounting-means constructed and arranged to provide for the turning movement of one of the said members with respect to the other member; guide-means constructed and arranged to guide the said flexible pointer-member for movement lengthwise of itself; and automatic actuating-means operatively connected to the said flexible pointer-member to automatically shift the same lengthwise of itself as one of the said members is turned with respect to the other member to thereby move the outer-portion of the pointer-member lengthwise in substantial conformity to the indicia on the said dial-member.

19. A dial-and-pointer indicating-device including in combination: a dial-member having indicia thereon; a pointer-member formed of flexible material movable lengthwise of itself and having an outer-portion disposed for reciprocation in a first plane adjacent the face of the said dial-member, the said pointer-member also having an inner-portion disposed for reciprocation in a second plane back of the said dial-member and in substantial parallelism with the said first plane, the said flexible pointer-member having a longitudinally-curved intermediate-portion connecting its said outer-portion and its said inner-portion; mounting-means constructed and arranged to provide for the turning movement of one of the said members with respect to the other member; guide-means constructed and arranged to guide the said flexible pointer-member for movement lengthwise of itself; and actuating-means operatively connected to the said flexible pointer-member to shift the same lengthwise of itself and move its outer-portion in substantial conformity to the indicia on the said dial-member.

20. A dial-and-pointer indicating-device including in combination: a dial-member; a pointer-member formed of flexible material movable lengthwise of itself and having an outer-portion disposed for reciprocation in a first plane adjacent the face of the said dial-member, the said pointer-member also having an inner-portion disposed for reciprocation in a second plane back of the said dial-member and in substantial parallelism with the said first plane, the said flexible pointer-member having a longitudinally-curved intermediate-portion connecting its said outer-portion and its said inner-portion; mounting-means constructed and arranged to provide for the turning movement of one of the said members with respect to the other member; guide-means constructed and arranged to guide the said flexible pointer-member for movement lengthwise of itself; and automatic actuating-means operatively connected to the inner-portion of the said flexible pointer-member at a point back of the said dial-member to automatically shift all three portions of the said pointer-member lengthwise of the pointer-member as one of the said members is turned with respect to the other member.

MALCOLM P. NICHOLS.